United States Patent
Marko et al.

(10) Patent No.: US 6,993,316 B2
(45) Date of Patent: Jan. 31, 2006

(54) METHOD AND APPARATUS FOR BACKUP POWER IN A COMMUNICATION SYSTEM

(75) Inventors: Paul Marko, Pembroke Pines, FL (US); Craig Wadin, Sunrise, FL (US)

(73) Assignee: XM Sattellite Radio, Inc., Washington, DC (US)

( * ) Notice: Subject to any disclaimer, the term of this patent is extended or adjusted under 35 U.S.C. 154(b) by 857 days.

(21) Appl. No.: 09/874,807

(22) Filed: Jun. 5, 2001

(65) Prior Publication Data

US 2002/0183036 A1 Dec. 5, 2002

(51) Int. Cl.
*H04B 1/16* (2006.01)

(52) U.S. Cl. ............... 455/343; 455/343.1; 455/343.2; 455/343.3; 455/343.4; 455/343.5; 455/343.6; 455/572

(58) Field of Classification Search ........... 455/572, 455/343.1, 343.2, 343.3–343.6
See application file for complete search history.

(56) References Cited

U.S. PATENT DOCUMENTS

| | | | |
|---|---|---|---|
| 5,060,300 A | * 10/1991 | Luber et al. | ............ 455/343.6 |
| 5,524,051 A | 6/1996 | Ryan | |
| 6,133,871 A | * 10/2000 | Krasner | ............... 342/357.06 |
| 6,222,484 B1 | 4/2001 | Seiple et al. | |
| 6,223,025 B1 | * 4/2001 | Tsukuda | .................... 340/7.37 |
| 6,330,463 B1 | * 12/2001 | Hedrich | ..................... 455/573 |
| 6,337,719 B1 | * 1/2002 | Cuccia | ........................ 348/731 |
| 6,353,747 B1 | * 3/2002 | Honda | ......................... 455/561 |
| 6,588,015 B1 | * 7/2003 | Eyer et al. | .................... 725/89 |
| 6,721,580 B1 | * 4/2004 | Moon | .......................... 455/574 |
| 2002/0049879 A1 | * 4/2002 | Eyer | .......................... 710/305 |

* cited by examiner

*Primary Examiner*—Ahmad F. Matar
*Assistant Examiner*—Marie C. Ubiles
(74) *Attorney, Agent, or Firm*—Akerman Senterfitt

(57) ABSTRACT

A digital receiver unit (28) having a backup energy source (214) for use in a vehicle (250) that operates on a primary energy source (216) includes a receiver (203) powered by the primary energy source when the vehicle is operating, a switching mechanism (210 and 212) for switching the receiver between the primary energy source and the backup energy source and a controller (210) coupled to the receiver for controlling the switching mechanism. The receiver receives data during a scheduled predetermined time and the backup energy source powers the receiver during the scheduled predetermined time if the vehicle is not operating.

17 Claims, 3 Drawing Sheets

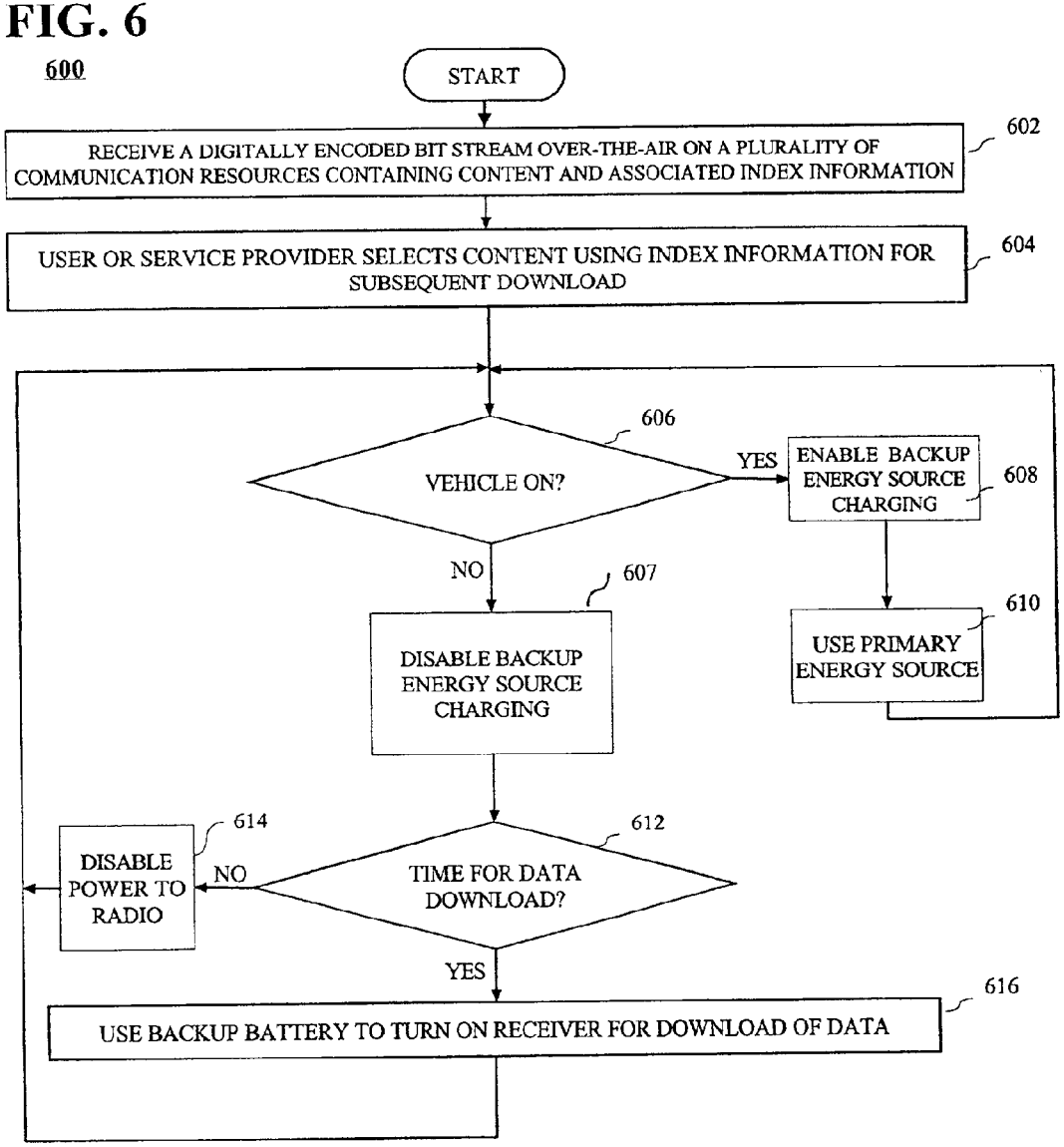

METHOD AND APPARATUS FOR BACKUP POWER IN A COMMUNICATION SYSTEM

CROSS-REFERENCE TO RELATED APPLICATIONS (not applicable)

FIELD OF THE INVENTION

The invention relates generally to a method and apparatus for providing backup power to a communication receiver, and more particularly to a method and apparatus for powering a receiver using a secondary source during a predetermined time period.

BACKGROUND OF THE INVENTION

Satellite radio operators will soon provide digital quality radio broadcast services covering the entire continental United States. These services will offer approximately 100 channels, of which approximately 50 channels in a typical configuration will provide music with the remaining stations offering news, sports, talk and data channels. Digital radio may also be available in the near future from conventional analog radio broadcasters that will provide a terrestrial based system using signals colocated in the AM and FM bands.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHZ) of the electromagnetic spectrum for satellite digital broadcasting, 12.5 MHz of which are owned by Sirius Satellite Radio and 12.5 MHz of which are owned by the assignee of the present application "XM Satellite Radio Inc."

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Mobile receivers will be capable of simultaneously receiving signals from two satellites and one terrestrial repeater for combined spatial, frequency and time diversity, which provides significant mitigation of multipath interference and addresses reception issues associated with blockage of the satellite signals.

In accordance with the XM frequency plan, each of two geostationary Hughes 702 satellites will transmit identical or at least similar program content. The signals transmitted with QPSK modulation from each satellite (hereinafter satellite 1 and satellite 2) will be time interleaved to lower the short-term time correlation and to maximize the robustness of the signal. For reliable reception, the LOS signals transmitted from satellite 1 are received, reformatted to Multi-Carrier Modulation (MCM) and rebroadcast by terrestrial repeaters. The XM System supports around 50 channels of music or data in Time Division Multiplex (TDM) format.

In any event, each of the digital audio radio systems described above will likely be received by a vehicle radio and powered by a primary battery that operates the vehicle itself. Industry leaders in car radio electronics will be offering 3-band AM/FM/XM radios that will be manufactured to replace existing car radios or will provide factory-installed AM/FM/XM radios to the automobile industry. Additionally, some of these radios may have the capability to provide data applications and even some telematics functions. These radios may work fine in operating the digital audio radio when the vehicle is operating to listen to a live broadcast or to perform data functions. Unfortunately, to adequately download relatively large amounts of data to the receiver when the vehicle is not operating will draw current from the vehicle battery in excess of automobile manufacturer specifications. For example, if a digital audio radio system contemplates downloading daily news files that requires the receiver to be powered for several hours a day for downloading such files, a vehicle battery could drain below specifications if the vehicle is being operated. Thus, a need exists for a method and apparatus for backup power in a communication system.

SUMMARY OF THE INVENTION

In a first aspect of the present invention, a method for providing a backup energy source for a digital receiver in a vehicle comprises the steps of powering the digital receiver with a primary energy source that powers the vehicle when the vehicle is operating and storing a schedule of program content enabling a user of the digital receiver to selectively download at least a portion of said program content during a predetermined time. The method also comprises the step of powering the digital receiver with the backup energy source during at least a portion of the predetermined time to enable the receipt of at least the portion of said program content selected when the vehicle is not powered by the primary energy source.

In a second aspect of the present invention, a digital receiver unit having a backup energy source for use in a vehicle that operates on a primary energy source comprises a receiver powered by the primary energy source when the vehicle is operating, a switching mechanism for switching the receiver between the primary energy source and the backup energy source, and a controller coupled to the receiver for controlling the switching mechanism, wherein the backup energy source powers the receiver if the vehicle is not operating during at least a portion of a predetermined time when the receiver receives data.

In a third aspect of the present invention, a digital audio receiver unit having a backup battery for use in an automobile that operates on a primary battery comprises a digital audio receiver (DAR) capable of receiving scheduled data at a predetermined time and a controller coupled to the digital audio receiver and programmed to enable the primary battery to power the DAR when the automobile ignition is enabled and to enable the backup battery to power the DAR during at least a portion of the predetermined time to receive the scheduled data when the ignition is disabled.

In a final aspect of the present invention, a device having a backup energy source for use in a vehicle that operates on a primary energy source for receiving, storing and playing back digital audio radio signals, comprises a receiver, a decoder, a user input, a storage medium, a switching mechanism and a system controller. The receiver receives a digitally encoded bit stream over-the-air on a plurality of communication resources, wherein one or more of the plurality of communication resources contains content and associated index information and wherein the receiver is powered by the primary energy source when the vehicle is operating, wherein the receiver receives data during a predetermined time. The decoder selectively decodes a selected plurality of communication resources. The user input selects the selected plurality of communication resources based on the associated index information and selects a portion of the content contained in the selected plurality of communication resources to be retrieved. The storage medium is coupled to the decoder and stores the content and associated index information contained in the selected plurality of communication resources. The switching mechanism switches the receiver between the primary energy source and the backup energy source. The system controller being coupled to the user input, stores and retrieves content to and from the storage medium based on input received at the user input and controls the switching mechanism, wherein the backup energy source powers the receiver during at least a portion of the predetermined time if the vehicle is not operating.

BRIEF DESCRIPTION OF THE DRAWINGS

FIG. 6 is a flowchart illustrating a method utilizing a backup energy source in accordance with the present invention.

DETAILED DESCRIPTION OF THE DRAWINGS

Figure 1:
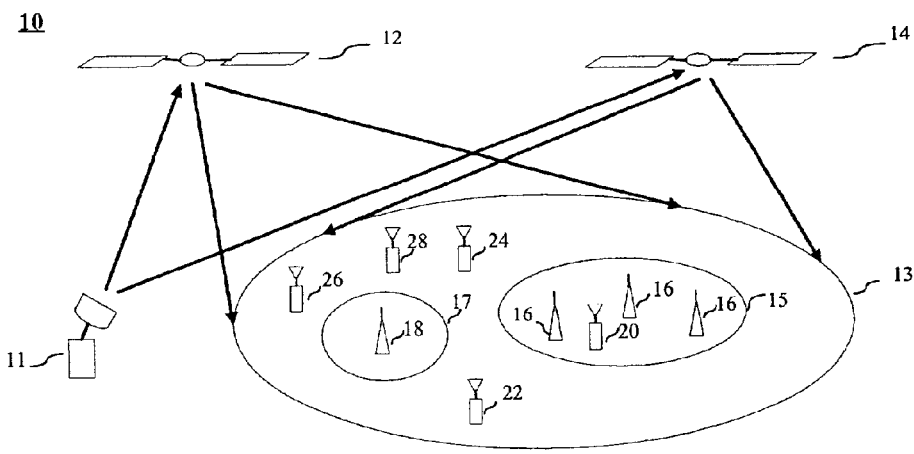
FIG. 1 illustrates a satellite digital audio radio service system architecture in accordance with the present invention.

Referring to FIG. 1, satellite radio operators will soon provide digital radio service to the continental United States. Briefly, the service provided by XM Satellite Radio includes a satellite X-band uplink 11 to two satellites (12 and 14) which provide frequency translation to the S-band for re-transmission to radio receivers (20, 22, 24, 26 and 28) on earth within the coverage area 13. The satellites provide for interleaving and spatial diversity. Radio frequency carriers from one of the satellites are also received by terrestrial repeaters (16 and 18). The content received at the repeaters are also "repeated" at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites 12 and 14 and the repeaters are received by SDARS receivers 20–28. As depicted in FIG. 1, the receivers 20–28 may be located in vehicles (such as automobiles, trucks, and boats), handheld or stationary units for home or office use. The SDARS receivers 20–28 are designed to receive one or both of the satellite signals and the signals from the terrestrial repeaters and combine or select one of the signals as the receiver output.

Figure 2:
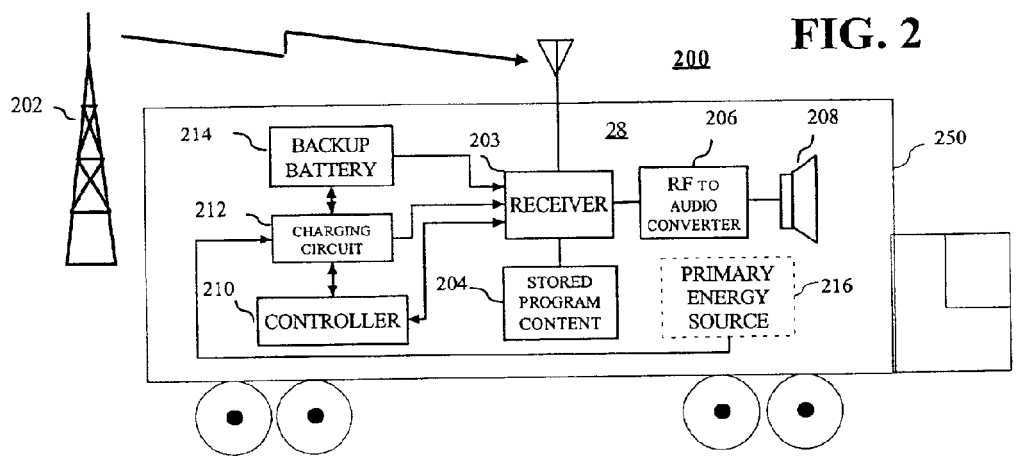
FIG. 2 is a block diagram illustrating a terrestrial based digital audio radio service system architecture used in a vehicle in accordance with the present invention.

Referring to FIG. 2, a terrestrial based radio communication system 200 is shown in accordance with present invention. The system 200 preferably comprises a transmission station 202 that transmits signals similar to the repeater stations described above or alternatively could be other transmission formats such as FM, or other modulation techniques suitable for transmission of digital audio. The system 200 also preferably includes a plurality of mobile receiver units (only receiver unit 28 shown in this example) each preferably having a receiver 203, stored program content in storage media 204, and a radio frequency to audio converter 206 for playing audio via speaker 208. The receiver unit 28 in accordance with the present invention is powered by a primary energy source or battery 216 that also preferably powers a vehicle such as truck 250. It should be understood by one ordinarily skilled in the art that this primary energy source can be the battery itself or a conventional alternator when the vehicle is operating. The receiver unit 28 also further comprises a controller 210 coupled to the receiver 203 and a charging circuit 212. The receiver unit 28 may also be powered by a backup power source such as backup battery 214.

Figure 3:
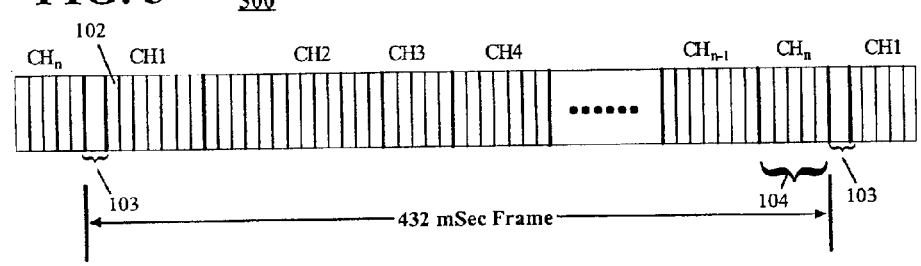
FIG. 3 is a diagram illustrating a representative bit stream in a frame format for distributing data in accordance with the present invention.

Referring to FIG. 3, a plurality of communication resource channels (Channel 1 through n) are shown in accordance with the present invention. In this instance, the over-the-air protocol frame format 300 of the XM Satellite Radio system is shown. This frame format 300 is based on a 432 millisecond frame as shown in FIG. 3 where each frame is started with a synchronization character 103 and is subdivided into 8 kilobit per second sub-channels 102. These sub-channels 102 can be dynamically grouped to form higher bit rate payload channels 104. The payload channel or communication resource 104 provides the necessary bandwidth to transport a high-quality digital audio signal to the listener as well as other data as will become more apparent. When a listener changes channels, a receiver in accordance with the present invention simply extracts a different payload channel from the frame 300. It should be noted that each receiver in the XM Satellite System has a unique identifier allowing for the capability of individually addressing each receiver over-the-air to enable or disable services or to provide custom applications such as individual data services or group data services.

Figure 4:
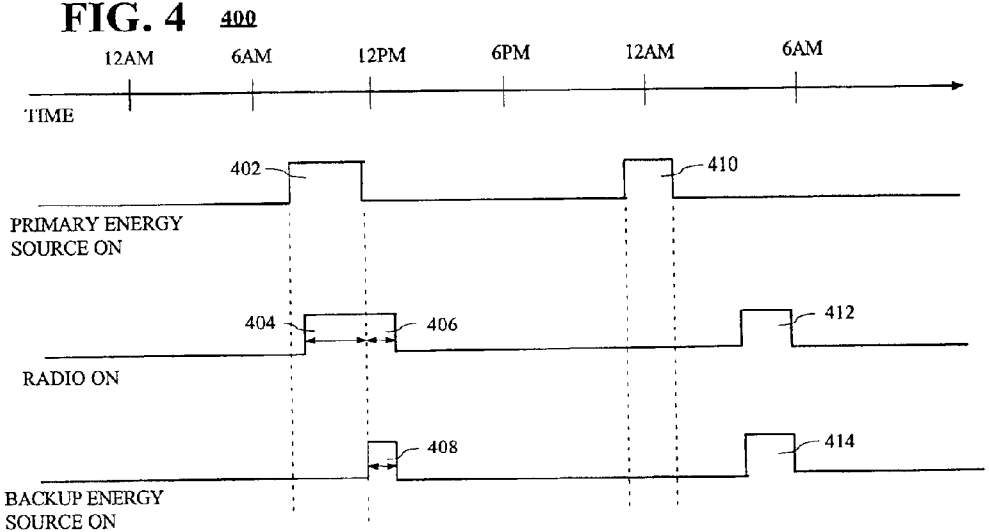
FIG. 4 is timing diagram illustrating the use of the primary and backup energy sources in accordance with the present invention.

Referring to FIG. 4, an illustration of a timing diagram of the primary and backup energy sources demonstrates a method in accordance with the present invention and shall be further described in conjunction with FIG. 6.

Figure 5:
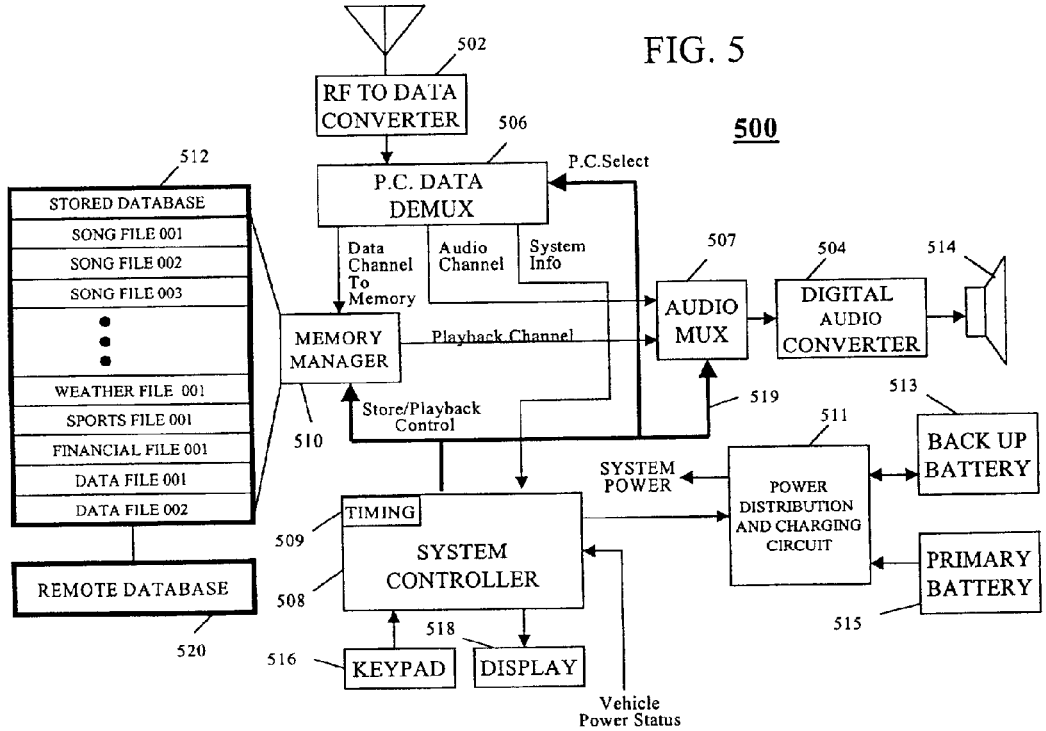
FIG. 5 is a block diagram of a radio receiver unit with storage media and backup energy source in accordance with the present invention.

Referring to FIG. 5, a block diagram of a typical subscriber radio or receiver unit 500 in accordance with the present invention is shown. The receiver unit 500 is preferably a digital receiver unit having a backup energy source (513) for use in a vehicle that operates on a primary energy source. The primary energy source can be considered a primary battery 515 or system power that may be provided by an alternator (not shown) when a car is operating for example. The receiver preferably receives data during a predetermined time and is preferably powered by the primary energy source when the vehicle is operating. The receiver unit 500 also comprises a switching mechanism for switching the receiver between the primary energy source and the backup energy source. The switching mechanism can take many forms within contemplation of the present invention and can be a stand-alone device or be embodied in a power distribution and charging circuit 511 or in combination with a system controller 508 coupled to the receiver. The circuit 511 would preferably be coupled to the backup energy source 513 and the primary energy source, enabling the primary energy source (preferably via the circuit 511) to recharge the backup energy source 513 when the vehicle is operating and to enable power from the backup battery 513 during a predetermined time when the vehicle might not be operating or otherwise receiving power from the primary energy source. Preferably, the system controller 508 controls the switching mechanism, wherein the backup energy source powers the receiver during the predetermined time if the vehicle is not operating (i.e., the engine is not operating and the keys are in the off position). The system controller 508 also preferably uses a low power timer 509 to enable the system controller to control timing for the operation of the receiver unit. The low power timer can be internal or external to the system controller. In any event, the system controller 508 can use the timer 509 and vehicle power status information to make a determination as to how to power the receiver unit in accordance with the present invention as will become more apparent with the description of FIG. 6.

The receiver unit 500 preferably comprises a memory manager 510 coupled to local storage media or a local database 512 having multiple content segments can be targeted for storage by the user using associated index information. A user could use a keypad 516 and display 518 coupled to the system controller to select the desired indexed information and perform other functions. The storage media 512 preferably contains a stored audio content database 512 that is accessible using the associated index information. The memory manager 510 may also be coupled to a remote database 520 that could contain and store data for use in telematic functions. The RF to Data block converter 502 provides access to the real-time over the air content segments. The converter 502 preferably provides a signal to a payload channel data demultiplexer 506 that in turn may provide a data channel to memory through the memory manager 510, an audio channel to a audio multiplexer 507, or a system information channel as shown. The system controller 508 also preferably includes a system bus 519 that allows it to control various components of the receiver unit. For example, the system bus 519 sends store and playback control signals to the memory manager 510 and the audio multiplexer 507 and can send a payload channel select signal to the payload channel data demultiplexer 506. The audio multiplexer 507 can receive "live broadcast" signals via the audio channel from the payload channel demultiplexer 506 and stored audio data from a playback channel via the memory manager 510 (and database 512). The audio multiplexer 507 then provides a digital signal to a digital audio converter 504 that converts the signal to audio through an audio output device 514 such as a speaker.

Referring to FIGS. 4, 5 and 6, a method 600 for providing a backup energy source for a digital receiver in a vehicle is shown. At step 602, a digitally encoded bit stream is preferably received over-the-air on a plurality of communication resources or channels containing content and associated index information. Such bit stream and associated index is preferably stored in a storage media 510. Storing a schedule of program content preferably enables a user of the digital receiver to selectively download at least a portion of said program content during a predetermined time. The digital receiver 500 is preferably powered with a primary energy source that powers the vehicle when the vehicle is operating or when the primary energy source is enabled. Thus, at step 604, the user selects content using index information for subsequent downloading. Alternatively, a service provider can select content to be subsequently downloaded in a telematics type application by addressing a command to the receiver for example. At decision block 606, it is determined if the vehicle is on (or if the primary battery is enabled). In other words, it is determined in an automobile if the ignition is turned on. If the vehicle is powered by the primary energy source, then the backup energy source charging is enabled at step 608 and the receiver unit 500 is preferably powered by the primary energy source at step 610. The process then returns to determine if the vehicle is powered as shown. While the vehicle is operating on the primary energy source, the primary energy source can recharge the backup energy source. If the vehicle is not powered by the primary energy source at decision block 606, the backup energy source charging is preferably disabled at step 607 and it is determined if the predetermined time for downloading data (as may have been requested by a user using the associated index information) at decision block 612. If the predetermined time for downloading data has not occurred, then the receiver unit 500 should be switched off all of the energy sources including the primary and backup energy sources at step 614. If the predetermined time period for downloading occurs at decision block 612 and the vehicle is not powered by the primary energy source, then at step 616 the backup energy source powers the receiver during the predetermined time to enable the receipt of all the available program content or at least a selected portion of said program content. Then the method preferably returns once again to determine whether the vehicle is operating.

To further illustrate a method in accordance with the present invention, reference is made to the example shown in the time lines of FIG. 4. In this instance, the radio is scheduled to receive program content (in the form of data such as music, news, or other data) for a short period after 12pm as illustrated by area 406 and before 6am as illustrated by area 412. If the radio were scheduled to received program content while the primary energy source powers the vehicle, then primary energy source preferably powers the receiver as well during the receipt of the program content. If a car operator operates a car between 8am and noon and later on around midnight as illustrated by areas 402 and 410 respectively, the user can operate the radio for listening and other functions during periods 402 and 410. In fact, as illustrated, the operator listens during period 404. When the scheduled program content is downloaded and the primary energy source is not available, the radio is powered using the backup energy source during periods 408 and 414 corresponding to the scheduled program content periods 406 and 412 respectively. It should also be noted, that the backup energy source is preferably charged during time periods 402 and 410 when the primary energy source is on.

The description above is intended by way of example only and is not intended to limit the present invention in any way except as set forth in the following claims.

We claim:

1. A method for providing a backup energy source for a digital receiver in a vehicle, comprising the steps of:

powering the digital receiver with a primary energy source that powers the vehicle when the vehicle is operating;

storing a schedule of program content enabling a user of the digital receiver to selectively download at least a portion of said program content during a predetermined time; and powering the digital receiver with the backup energy source during at least a portion of the predetermined time to enable the receipt of at least the portion of said program content selected when an ignition of the vehicle is disabled.

2. The method of claim 1, wherein the method further comprises the step of recharging the backup energy source with the primary energy source when the vehicle is powered by the primary energy source.

3. The method of claim 1, wherein the method further comprises the step of powering the digital receiver with the primary energy source when the vehicle is powered by the primary energy source.

4. The method of claim 1, wherein the step of powering the digital receiver further comprises enabling the over-the-air receipt of all of the program content when the ignition of the vehicle is disabled.

5. The method of claim 1, wherein the vehicle is operating when an ignition of the vehicle is enabled.

6. A digital receiver unit having a backup energy source for use in a vehicle that operates on a primary energy source, comprising:
- a receiver powered by the primary energy source when the vehicle is operating, wherein the receiver receives data during a predetermined time;
- a switching mechanism for switching the receiver between the primary energy source and the backup energy source; and
- a controller coupled to the receiver for controlling the switching mechanism, wherein the backup energy source powers the receiver during at least a portion of the predetermined time if an ignition of the vehicle is disabled.

7. The digital receiver unit of claim 6, wherein the unit further comprises a charging circuit coupled to the backup energy source and the primary energy source, enabling the primary energy source to recharge the backup energy source when the vehicle is operating.

8. The digital receiver unit of claim 6, wherein the backup energy source and the primary energy source are batteries.

9. The digital receiver unit of claim 6, wherein the receiver is a satellite digital audio receiver that receives a schedule of program content that enables a user to selectively download at least a portion of said program content during the predetermined time using the primary energy source when the vehicle is operating and using the backup energy source when the ignition of the vehicle is disabled.

10. The digital receiver unit of claim 6, wherein the data comprises program content.

11. The digital receiver unit of claim 6, wherein the vehicle is operating when the ignition is enabled.

12. A digital audio receiver unit having a backup battery for use in an automobile that operates on a primary battery, comprising:
- a digital audio receiver (DAR) capable of receiving scheduled data at a predetermined time; and
- a controller coupled to the digital audio receiver and programmed to enable the primary battery to power the DAR when the automobile ignition is enabled and to enable the backup battery to power the DAR during at least a portion of the predetermined time to receive the scheduled data when the ignition is disabled.

13. The digital audio receiver unit of claim 12, wherein the unit further comprises a charging circuit coupled to the backup battery and the primary battery, enabling the primary battery to recharge the backup battery when the automobile is operating.

14. The digital audio receiver unit of claim 12, wherein the unit further comprise a user input and wherein the scheduled data comprises an index of scheduled program content allowing a user using the user input to select portions of the scheduled program from the index for subsequent downloading over the air.

15. A device for receiving, storing and playing back digital audio radio signals, the device having a backup energy source for use in a vehicle that operates on a primary energy source, comprising:
- a receiver for receiving a digitally encoded bit stream over-the-air on a plurality of communication resources, wherein each of the plurality of communication resources contains content and associated index information and wherein the receiver is powered by the primary energy source when the vehicle is operating, wherein the receiver receives data during a predetermined time;
- a decoder for selectively decoding a selected plurality of communication resources;
- a user input for selecting the selected plurality of communication resources based on the associated index information and for selecting a portion of the content contained in selected plurality of communication resources to be retrieved;
- a storage medium coupled to the decoder for storing the content and associated index information contained in the selected plurality of communication resources;
- a switching mechanism for switching the receiver between the primary energy source and the backup energy source; and
- a system controller coupled to the user input for storing and retrieving content to and from the storage medium based on input received at the user input and for controlling the switching mechanism, wherein the backup energy source powers the receiver during at least a portion of the predetermined time if an ignition of the vehicle is disabled.

16. The device of claim 15, wherein the device further comprises a charging circuit coupled to the backup energy source and the primary energy source, enabling the primary energy source to recharge the backup energy source when the vehicle is operating.

17. The device of claim 15, wherein the backup energy source and the primary energy source are batteries.

* * * * *

UNITED STATES PATENT AND TRADEMARK OFFICE
CERTIFICATE OF CORRECTION

PATENT NO. : 6,993,316 B2
DATED : January 31, 2006
INVENTOR(S) : Marko et al.

It is certified that error appears in the above-identified patent and that said Letters Patent is hereby corrected as shown below:

Title page,
Item [73], Assignee, replace "XM Sattellite Radio, Inc." with -- XM Satellite Radio, Inc. --.

Signed and Sealed this

Second Day of May, 2006

JON W. DUDAS
*Director of the United States Patent and Trademark Office*